(12) United States Patent
Danev et al.

(10) Patent No.: US 10,864,949 B2
(45) Date of Patent: Dec. 15, 2020

(54) AIR-GUIDING ARRANGEMENT FOR A MOTOR VEHICLE

(71) Applicant: Dr. Ing. h.c. F. Porsche Aktiengesellschaft, Stuttgart (DE)

(72) Inventors: Dimitar Danev, Renningen (DE); Klaus Pfister, Maulbronn (DE); Markus Paulitsch, Ettlingen (DE); Steffen Hoelzel, Eberdingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 16/375,910

(22) Filed: Apr. 5, 2019

(65) Prior Publication Data

US 2019/0315416 A1    Oct. 17, 2019

(30) Foreign Application Priority Data

Apr. 13, 2018    (DE) .................... 10 2018 108 805

(51) Int. Cl.
*B62D 35/00*    (2006.01)
(52) U.S. Cl.
CPC .................. *B62D 35/005* (2013.01)
(58) Field of Classification Search
CPC .... B62D 35/00; B62D 35/001; B62D 35/002; B62D 35/004; B62D 35/005; B62D 35/007; B62D 35/008; B62D 37/02; B60R 19/20; B60R 19/205; B60R 21/013
USPC .................. 296/180.1–180.5; 293/107, 134; 74/502.6; 248/79, 80, 83, 75
See application file for complete search history.

(56) References Cited

U.S. PATENT DOCUMENTS

| | | | |
|---|---|---|---|
| 6,109,569 A | 8/2000 | Sakaida | |
| 7,040,690 B2* | 5/2006 | Soja | B62D 35/005 296/180.5 |
| 8,562,067 B2* | 10/2013 | Hoelzel | B62D 35/005 296/180.5 |
| 8,864,215 B2* | 10/2014 | Hoelzel | B62D 35/005 296/180.5 |
| 9,126,639 B2* | 9/2015 | Hoelzel | B62D 35/005 |
| 9,126,640 B2* | 9/2015 | Hoelzel | B62D 35/005 |
| 2003/0116996 A1 | 6/2003 | Soja et al. | |
| 2013/0057022 A1 | 3/2013 | Hoelzel | |

FOREIGN PATENT DOCUMENTS

DE    102011112514 A1    3/2013

* cited by examiner

*Primary Examiner* — Dennis H Pedder
(74) *Attorney, Agent, or Firm* — Leydig, Voit & Mayer, Ltd.

(57) ABSTRACT

An air-guiding arrangement for a motor vehicle has: a carrier, which is arranged on a body of the motor vehicle, and on which an air guide is provided such that it is driveable by a pneumatic drive with at least one air chamber for actuation, the at least one air chamber being arranged on the carrier such that the air guide is transferrable from a retracted basic position into a deployed maximum position, and at least one pneumatic supply line which, via at least one connector member, pneumatically connects the at least one air chamber to a pneumatics module of the pneumatic drive. The at least one pneumatic supply line is fixed to the carrier by at least one fastener.

15 Claims, 3 Drawing Sheets

AIR-GUIDING ARRANGEMENT FOR A MOTOR VEHICLE

CROSS-REFERENCE TO PRIOR APPLICATIONS

Priority is claimed to German Patent Application No. DE 10 2018 108 805.1, filed on Apr. 13, 2018, the entire disclosure of which is hereby incorporated by reference herein.

FIELD

The invention relates to an air-guiding arrangement for a motor vehicle.

BACKGROUND

A generic air-guiding device is known from the German laid-open specification DE 10 2011 112 514 A1. Here, so-called air hoses are provided as pneumatic supply lines for the air chambers. A disadvantage of this air-guiding arrangement is that the supply lines, which are installed for the first time during the final assembly of the motor vehicle in the already-assembled front part, are susceptible to damage.

SUMMARY

An embodiment of the present invention provides an air-guiding arrangement for a motor vehicle that has: a carrier, which is arranged on a body of the motor vehicle, and on which an air guide is provided such that it is driveable by a pneumatic drive with at least one air chamber for actuation, the at least one air chamber being arranged on the carrier such that the air guide is transferrable from a retracted basic position into a deployed maximum position, and at least one pneumatic supply line which, via at least one connector member, pneumatically connects the at least one air chamber to a pneumatics module of the pneumatic drive. The at least one pneumatic supply line is fixed to the carrier by at least one fastener.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
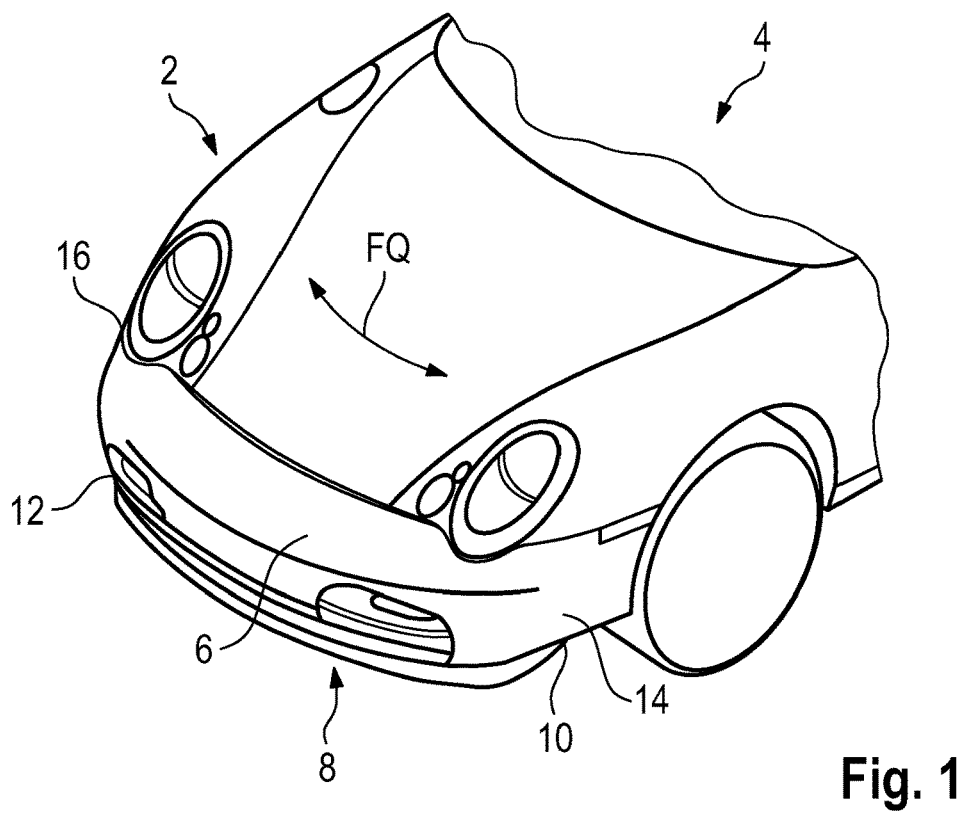
FIG. 1 shows a perspective view of a front region of a motor vehicle.

Embodiments of the present invention provide an air-guiding arrangement for a motor vehicle, having a carrier part which is arranged on a body part and on which an air-guiding element is provided such that it can be driven by means of a pneumatic drive arrangement with at least one air chamber for actuation, which at least one air chamber is arranged on the carrier part such that the air-guiding element can be transferred from a retracted basic position into a deployed maximum position, wherein at least one pneumatic supply line is provided which, via at least one connector member, pneumatically connects the at least one air chamber to a pneumatics module of the pneumatic drive arrangement.

Embodiments of the present invention avoid the above-stated disadvantage of air-guiding elements in as inexpensive and simple a manner as possible.

Embodiments of the invention present invention avoid the above-stated disadvantages by having at least one pneumatic supply line be fixed to the carrier part by fasteners. It is thus possible for the supply lines to be fixed in a desired manner to the carrier part already at a preassembly stage. Damage resulting from an undefined profile of the supply lines can be avoided in this way. Furthermore, the assembly effort at the final assembly stage can be greatly reduced.

It is advantageous for two supply lines to be provided, wherein a first supply line is provided for the feed of fluid and a second supply line is provided for the discharge of fluid. In an alternative embodiment, one supply line may also be used for the feed of fluid and discharge of fluid. It is advantageous here if at least the first supply line has a connector line for the pneumatic connection of the first pneumatic speed line to the pneumatics module. Here, it is advantageously possible for the connector line to be connected by means of a T-shaped connecting piece to the first supply line and to a connector member, which may be produced for example from plastic. It is thus possible in a simple manner to provide an integrated anti-kink guard with tension-relieving action, and to thus protect the first supply line, which is particularly susceptible to damage.

The first and the second supply line are particularly advantageously arranged at least regionally in a common fastening member.

The air-guiding element (air guide) is in this case advantageously designed as a front spoiler lip.

It is furthermore possible for at least one energy line for the supply to and/or control of electrical components, such as for example sensors, to be provided, which is fixed by means of fastening members to the carrier part.

Both the fastening members for the supply lines and the fastening members for the energy lines may be designed as clip-in members.

The carrier part (carrier) advantageously has an edge element at least at one longitudinal side, wherein at least the first supply line is fixed in the region of the edge element.

The invention will be discussed in more detail on the basis of a drawings.

FIG. 1 shows a front portion 2 of a motor vehicle 4. The front portion 2 has a front-end part (front end) 6, on which an air-guiding arrangement 8 is provided for the purposes of optimizing driving characteristics, in particular at high speeds. Here, the air-guiding arrangement 8 extends in a vehicle transverse direction FQ and ends with its free ends 10, 12 at longitudinal portions 14, 16 of the front-end part 6.

Figure 2:
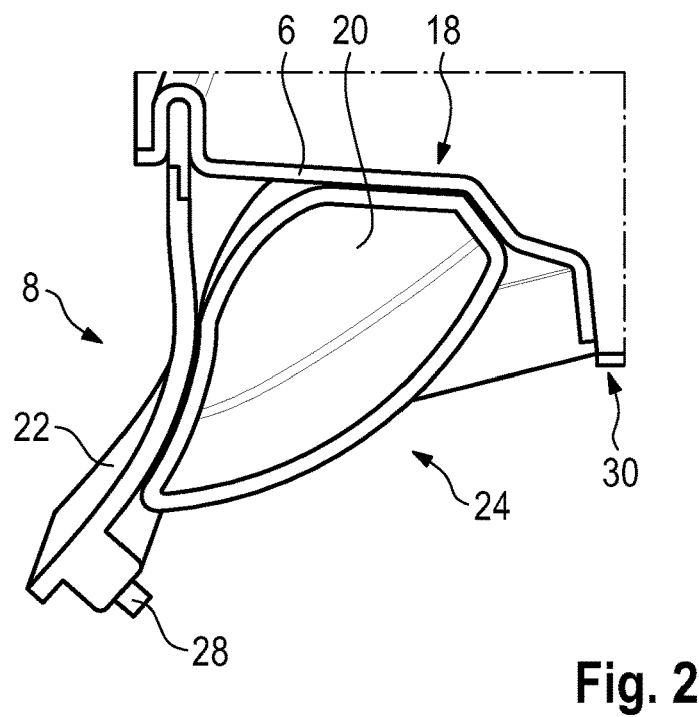
FIG. 2 shows a sectional view of a deployed air-guiding element of an air-guiding arrangement.

FIG. 2 shows a sectional view in the region of the air-guiding arrangement 8 of FIG. 1. A carrier part 18 of the air-guiding arrangement 8 is provided on the front-end part 6. On said carrier part 18, there is arranged an air chamber 20, which transfers an air-guiding element 22 from a retracted basic position into a deployed maximum position. FIG. 2 illustrates the maximum position. The number of air chambers 20 is arbitrary.

In order that the air chamber 20, which is part of a pneumatic drive arrangement 24, can be filled with a fluid, it is fluidically connected via at least one pneumatic supply line 26 (in this regard, see FIG. 3) to a pneumatics module (not illustrated in any more detail) of the pneumatic drive arrangement 24.

The reference designations 28 and 30 are used to denote magnetic elements which, in a retracted basic position of the air-guiding element 22, ensure reliable fixing to the carrier part 18.

Figure 3:
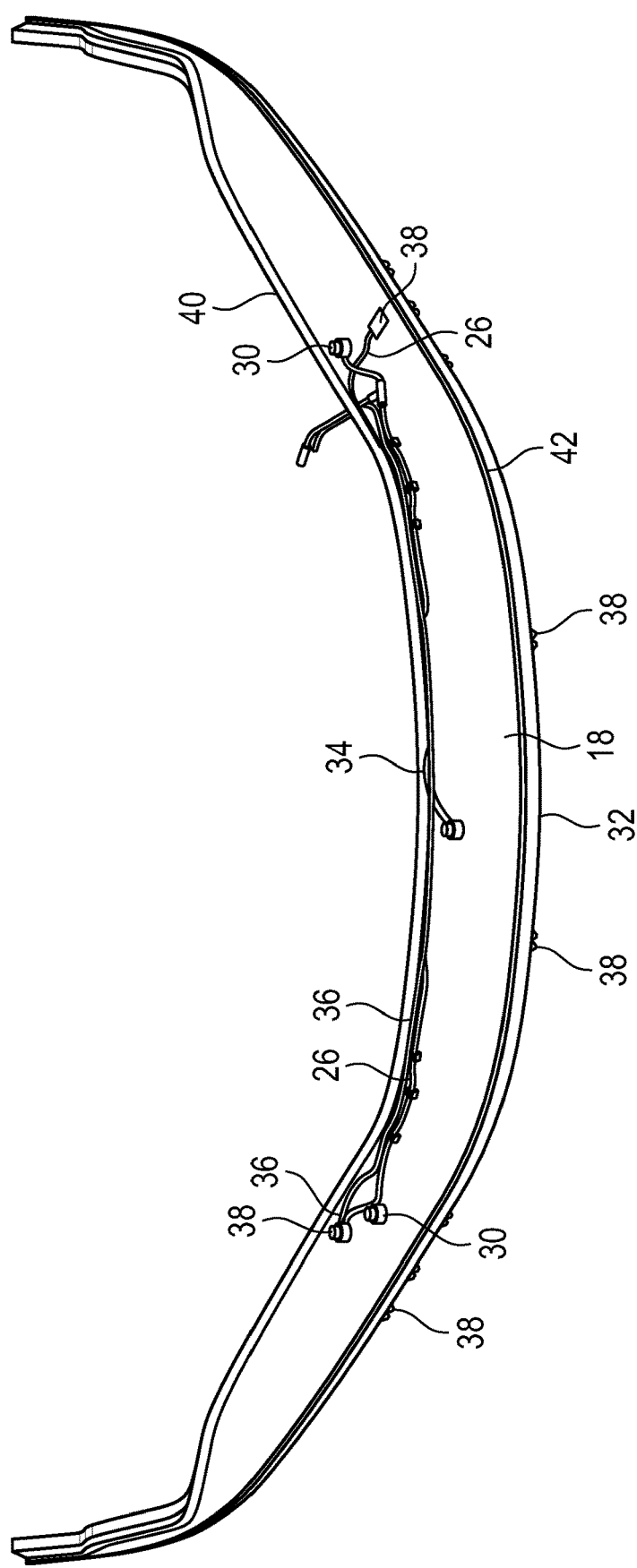
FIG. 3 shows a plan view of an opened carrier part of the air-guiding arrangement from FIG. 2.

FIG. 3 shows, in a plan view, the opened carrier part 18. In the normal state for assembly, the carrier part 18 has a cover element (not illustrated in any more detail). In the carrier part 18, there are provided connector members 30 which are connected to a first supply line 26 for the feed of fluid to the air chamber 20. Furthermore, a connector member 32 is provided, which is connected to a second supply line 34 for the discharge of fluid from the air chamber 20. Also illustrated is an energy line 36 which serves for the supply to schematically illustrated electrical components 38. The carrier part 18 has 2 edge elements 40, 42, wherein the pneumatic supply lines 26, 34 and the energy line 36 run in a fixed manner in the region of the first edge element 40 and, in this simple manner, are protected against damage during transport after the preassembly stage or during operation.

Figure 4:
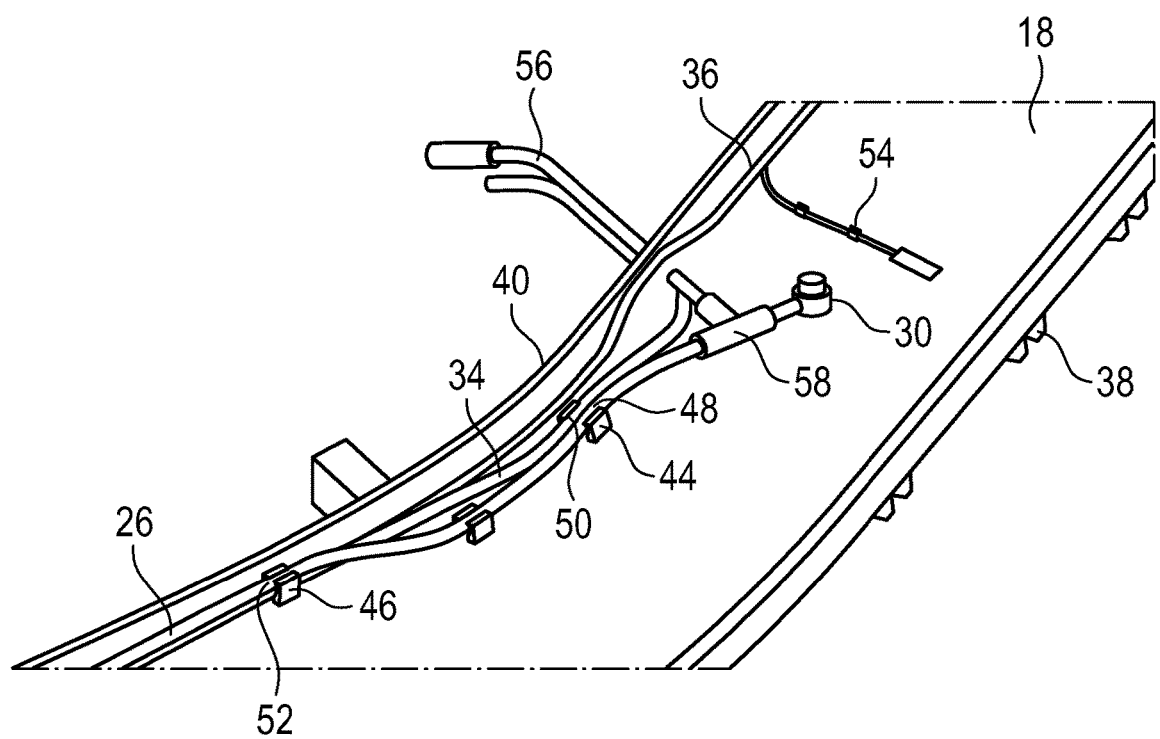
FIG. 4 shows a detailed view of the carrier part from FIG. 3.

FIG. 4 shows, in detail, how the pneumatic supply lines 26, 34 and the energy line 36 are fixed in the carrier part 18. FIG. 4 shows a detail of the carrier part 18 from FIG. 3. For the pneumatic supply lines 26, 34, fastening members 44 and 46 are provided which are designed as clip-in members. Here, the clip-in member 44 has two adjacently arranged clip-in openings 48, 50, into which in each case the first supply line 26 and the second supply line 34 are clipped. The clip-in member 46 has only one clip-in opening 52, into which both the first supply line 26 and the second supply line 34 are clipped. The energy line 36 is fixed in clip-in members 54.

In order to protect in particular the first supply line 26 against damage owing to kinking or tension, a connector line 56 is provided which is fluidically connected by means of a T-shaped connecting piece 58 to a connector member 30 for the feed of fluid and to the first supply line 26.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An air-guiding arrangement for a motor vehicle, the air guiding arrangement comprising:
   a carrier, which is arranged on a body of the motor vehicle, and on which an air guide is provided such that it is driveable by a pneumatic drive with at least one air chamber for actuation, the at least one air chamber being arranged on the carrier such that the air guide is transferrable from a retracted basic position into a deployed maximum position, and
   at least one pneumatic supply line for pneumatically connecting, via at least one connector member, the at least one air chamber to a pneumatics module of the pneumatic drive,
   wherein the at least one pneumatic supply line is configured such that, in a state prior to fixing the air-guiding arrangement to the motor vehicle, the at least one pneumatic supply line is fixed to the carrier by at least one fastener.

2. The air-guiding arrangement as claimed in claim 1,
   wherein the at least one pneumatic supply line comprises one or two supply lines, and
   wherein the one or two supply lines are provided in each case for the feed of fluid and/or discharge of fluid.

3. The air-guiding arrangement as claimed in claim 2, wherein at least a first supply line of the one or two supply lines has a connector line for the pneumatic connection of the first pneumatic supply line to the pneumatics module.

4. The air-guiding arrangement as claimed in claim 3, wherein the connector line is connected by a T-shaped connecting piece to the first supply line and to a connector member.

5. The air-guiding arrangement as claimed in claim 1, wherein a first supply line and a second supply line of the at least one pneumatic supply line are arranged at least regionally in a common fastener of the at least one fastener.

6. The air-guiding arrangement as claimed in claim 1, wherein the air-guiding element is a front spoiler lip.

7. The air-guiding arrangement as claimed in claim 1, wherein at least one energy line for the supply to and/or control of electrical components is provided, and which is fixed to the carrier.

8. The air-guiding arrangement as claimed in claim 7, wherein the electrical components comprise sensors.

9. The air-guiding arrangement as claimed in claim 7, wherein the at least one energy line is fixed to the carrier by another fastener.

10. The air-guiding arrangement as claimed in claim 1, wherein the at least one fastener is a clip-in fasteners.

11. The air-guiding arrangement as claimed in claim 1,
    wherein the carrier has an edge element at least at one longitudinal side, and
    wherein at least the first supply line of the at least one pneumatic supply line is fixed in the region of the edge element.

12. The air-guiding arrangement as claimed in claim 1, wherein the first supply line of the at least one pneumatic supply line and the at least one energy line are fixed to the carrier by a single clip-in fastener having two adjacently arranged clip-in openings.

13. The air-guiding arrangement as claimed in claim 1, wherein the at least one pneumatic supply line is fixed to the carrier in a plurality of locations using a combination of clip-in fasteners having single clip-in openings and a plurality of clip-in openings.

14. A method for pre-assembling an air-guiding arrangement, the method comprising:
   providing an air guide that is driveable by a pneumatic drive with at least one air chamber for actuation,
   arranging the at least one air chamber on a carrier such that the air guide is transferrable from a retracted basic position into a deployed maximum position, and
   fixing at least one pneumatic supply line by at least one fastener to the carrier for pneumatically connecting, via at least one connector member, the at least one air chamber to a pneumatics module of the pneumatic drive,
   wherein the fixing of the at least one pneumatic supply line to the carrier by at least one fastener occurs before fixing the air-guiding arrangement to a front end part of a motor vehicle.

15. A method for installing the air-guiding arrangement pre-assembled according to the method of claim 14, the method comprising fixing the pre-assembled air-guiding arrangement to the front end part of the motor vehicle.

* * * * *